United States Patent
Handgen et al.

(10) Patent No.: US 7,941,610 B2
(45) Date of Patent: May 10, 2011

(54) COHERENCY DIRECTORY UPDATING IN A MULTIPROCESSOR COMPUTING SYSTEM

(75) Inventors: Erin A. Handgen, Ft. Collins, CO (US); Patrick Knebel, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

(21) Appl. No.: 11/413,158

(22) Filed: Apr. 27, 2006

(65) Prior Publication Data

US 2007/0255906 A1   Nov. 1, 2007

(51) Int. Cl.
*G06F 12/00* (2006.01)
*G06F 13/00* (2006.01)
*G06F 13/28* (2006.01)

(52) U.S. Cl. ........ 711/144; 711/119; 711/141; 711/146; 711/E12.026; 711/E12.027

(58) Field of Classification Search .......... None
See application file for complete search history.

(56) References Cited

U.S. PATENT DOCUMENTS

| | | | |
|---|---|---|---|
| 4,463,420 A | 7/1984 | Fletcher | |
| 5,655,103 A | 8/1997 | Cheng et al. | |
| 5,737,568 A | 4/1998 | Hamaguchi et al. | |
| 6,049,851 A | 4/2000 | Bryg et al. | |
| 6,438,659 B1 * | 8/2002 | Bauman et al. | 711/141 |
| 6,502,168 B1 * | 12/2002 | Arimilli et al. | 711/119 |
| 6,857,051 B2 | 2/2005 | Sharma et al. | |
| 6,868,481 B1 | 3/2005 | Gaither et al. | |
| 2006/0179242 A1 * | 8/2006 | Ghai et al. | 711/141 |

FOREIGN PATENT DOCUMENTS

| | | |
|---|---|---|
| DE | 697 27 856 | 2/2005 |
| WO | WO 2005/109206 | 11/2005 |

OTHER PUBLICATIONS

Jim Handy, "The Cache Memory Book", 1998, Academic Press, ICN, 2nd edition, pp. xi, 14-15 and 204-205.*
HP Technology Brief, "HP server technology: a scalable coherency mechanism (SCM)," Jan. 2002.
DE Office Action, application No. 102007018033,2, dated Aug. 27, 2008, 4 pages.
DE Office Action, application No. 102007018033,2, dated Dec. 11, 2009, 4 pages.

* cited by examiner

*Primary Examiner* — Matt Kim
*Assistant Examiner* — Michael Alsip

(57) ABSTRACT

Coherency directory updating is provided in a multiprocessor computing system. A plurality of memory resources have a directory, and are operably connected to an interconnect fabric. A cell is operably connected to the interconnect fabric. The cell has a cache including an entry for each of a plurality of coherency units, each coherency unit included in a memory block representing a contiguous portion of the plurality of memory resources. A controller is operably connected to the interconnect fabric. The controller is configured to control a portion of the plurality of memory resources, and has a comparator configured to identify whether a memory block is local. If the memory block is local, the controller is configured to set a state of the directory to exclusive for a write transaction. If the memory block is not local, the controller is configured to set the state to invalid for a write transaction.

24 Claims, 4 Drawing Sheets

COHERENCY DIRECTORY UPDATING IN A MULTIPROCESSOR COMPUTING SYSTEM

BACKGROUND

In a modern computer system architecture, multiple memory caches are maintained to reduce latency in accessing main memory. A cache typically has a plurality of entries. Each entry holds a certain number of bytes, known as a cache line.

When a processor makes a change to data in main memory, copies of the data maintained in one or more of the caches may become inconsistent (e.g., stale or out of date) with main memory or with other caches. Similarly, when a processor makes a change to data in one of the caches, copies of the data in main memory or in other caches may become inconsistent with the changed data. Cache coherency protocols are used to maintain the consistency of data between caches. There are two general classes of cache coherency protocols: snooping, and directory-based.

In a snooping protocol, every cache that has a copy of the data from a block of physical memory also has a copy of information about the data block. Each cache is typically located on a shared memory bus, and all cache controllers monitor or snoop on the bus to determine whether or not they have a copy of the shared block. Typically, snooping protocols have primarily been used in small multiprocessor or single processor systems, while larger high-performance multiprocessor systems use directory-based coherency protocols.

In a directory-based protocol, a directory is used to maintain memory cache coherency and state. A coherency unit is a block of physical memory corresponding to a cache line. Typically, the smallest unit of memory that can be transferred between the main memory and the cache is a coherency unit. Information about one coherency unit is kept in just one location; that is, each coherency unit has a directory. Information in the directory generally includes which cache or caches have a copy of the coherency unit, and whether that copy is marked exclusive for future modification. An access to a particular coherency unit first queries the directory. If a cache has an exclusive copy, the memory data in the coherency unit may be stale. The real data may then be a modified cache line residing in the exclusive cache. If it is possible that the data in the coherency unit is stale, then the cache containing the real data is forced to return its data to the corresponding coherency unit in main memory. The physical memory then forwards the data to the new requester, updating the directory with the new cache location of that coherency unit.

Often, dynamic random access memory (DRAM) memory is used to store the directory. However, a great deal of memory bandwidth and power may be consumed to access and update directories. The use of an on-chip directory cache may reduce the amount of external memory bandwidth, but is generally not desired because of increased application-specific integrated circuit (ASIC) costs due to an increase in silicon area and design complexity, and increased on-chip power requirements.

Unlike older dual inline memory modules (DIMMs), fully-buffered DIMM (FBD) modules use high speed serial links. FBD DIMMs generally are able to provide twice as much read bandwidth as write bandwidth, based upon a design assumption that applications will require more read bandwidth than write bandwidth. This assumption is problematic for existing directory-based systems, because directory updates may cause the write bandwidth to double or triple relative to read bandwidth, causing poor utilization of the available memory bandwidth. Especially in high-end server chipset architectures, situations may arise where a processor will issue two read transactions per write transaction; for example, when directory information for cache line ownership is maintained in the DIMMs, a typical memory read transaction turns into a read-modify-write transaction from the perspective of the DIMMs. In an illustrative example, two processor reads and one processor write can lead to additional directory updates, yielding two DRAM memory reads and three DRAM memory writes, and thus consuming 60% more memory bandwidth and power than the cache line accesses alone.

BRIEF DESCRIPTION OF THE DRAWINGS

For the purpose of illustrating the invention, there is shown in the drawings a form that is presently exemplary; it being understood, however, that this invention is not limited to the precise arrangements and instrumentalities shown.

DETAILED DESCRIPTION

Overview

Aspects of the invention are able to increase performance and reduce power consumption for directory-based systems that use DRAM memory to store and update directories, by providing a low-cost mechanism to reduce the bandwidth required for directory updates, while increasing the amount of bandwidth available to software applications and an operating system. Minimal silicon area and verification overhead is required to implement a directory policy in accordance with embodiments of the invention.

In multiprocessor computing systems, memory is generally distributed among several processors. Memory that is local to a processor (e.g., attached to the same ASIC, or residing on the same motherboard) can be shared by many processors or can be primarily used by the local processors. Some regions of memory may be designated as essentially reserved for local processors, or for a particular process thread running on local processors. In an exemplary embodiment, such regions are called local memory regions. Illustrative examples of local memory regions include cell local memory (CLM) regions, and other types of single-owner memory regions. In such regions of memory, each cache line will tend to be owned by or reserved for a single cache agent.

Figure 1:
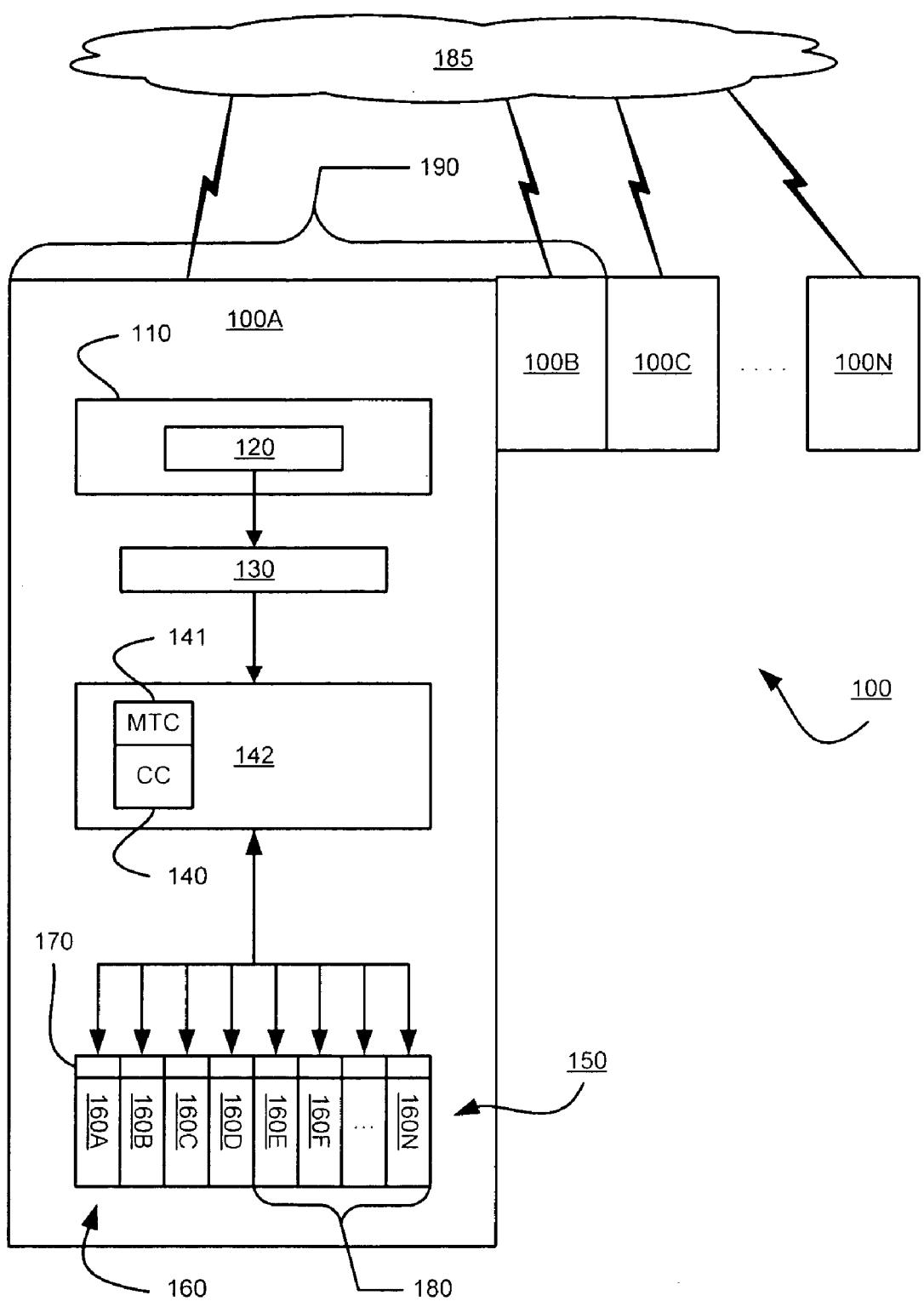
FIG. 1 is a block diagram depicting exemplary memory organization in a multiprocessor computing system, according to an embodiment of the invention.

In an illustrative embodiment depicted in FIG. 1, a local memory region is a CLM region. In some embodiments, CLM regions are main memory regions that have a low-latency non-uniform memory access (NUMA) affinity for a specific set of one or more process threads running on one or more CPUs that in turn reside on one or more CPU sockets. In an illustrative example, exemplary systems based on the sx2000 server chipset (commercially available from Hewlett- Packard Co.) can have up to sixteen process threads running on eight dual-threaded processor cores found in four CPU sockets for one CLM region. In other embodiments, such as in systems having integrated memory controllers on the CPU socket, each CLM region may support only process threads running on the CPU socket. Designation of a memory region as a CLM region, in some embodiments, only indicates that a specific process thread will have an affinity for the CLM region, but does not guarantee exclusive access to the CLM region by the preferred process thread.

Aspects of the invention identify local memory regions, such as by using a content-addressable memory (CAM) (e.g., a small and inexpensive address CAM) having state information to identify local memory regions. Embodiments of the invention implement a specialized directory update policy for memory in a local memory region. Further aspects of the invention avoid changing the directory state of a local memory cache line, since, in some embodiments, the cache line generally will be primarily owned by the same process thread (which implies the same cache agent).

A directory-based system, according to an embodiment of the invention, has Exclusive (E), Shared (S), and Invalid (I) directory states. Therefore, the possible directory state transitions are E-to-E, E-to-S, E-to-I, S-to-E, S-to-S, S-to-I, I-to-E, I-to-S, and I-to-I. For regions of memory that are primarily accessed by a single processor, such as local memory regions, the E-to-I and I-to-E directory transitions are most commonly prevalent.

In a typical exemplary multiprocessor computing system using directory-based coherency protocols, it is estimated that as many as 50% of all memory accesses exhibit E-to-I directory state transitions. Accordingly, by changing the directory policy for local memory regions such that E-to-I directory state transitions are prohibited, embodiments of the invention can significantly reduce the number of directory transitions, thus reducing extra bandwidth and power required for directory updates.

Embodiments of the invention allow directory-based multiprocessor computing systems, such as those using FBD DIMM technology, to gain more memory bandwidth by reducing the amount of wasteful writes on a write channel. Such a reduction also indirectly impacts the bandwidth on a read channel. Therefore, more bandwidth is available to the application and less is wasted on unnecessary directory updates. By reducing the number of writes, less power can be consumed for a given level of computing performance.

Illustrative Computing Environment

Referring to the drawings, in which like reference numerals indicate like elements, FIG. 1 depicts exemplary memory organization in a multiprocessor computing system 100 according to an embodiment of the invention, in which the herein described apparatus and methods may be employed. The multiprocessor computing system 100 has a plurality of cells 100A . . . 100N. For illustrative purposes, cell 100A is depicted in greater detail than cells 100B . . . 100N, each of which may be functionally similar to cell 100A or substantially identical to cell 100A.

Each of the cells 100A . . . 100N is connected to an interconnect fabric 185, through which memory resources may be accessed. Interconnect fabric 185 can include network infrastructure for connecting system resources such as chips, cells, memory controllers, and the like. Interconnect fabric 185 may, for example, include switches, routers, backplanes, and/or crossbars. In a further illustrative example, an interconnect fabric 185 may comprise an InfiniBand system having host-channel adapters in servers, target-channel adapters in memory systems or gateways, and connecting hardware (e.g., switches using Fibre Channel and/or Ethernet connections).

In an exemplary embodiment, the system 100 is able to run multiple instances of an operating system by defining multiple partitions, which may be managed and reconfigured through software. In such embodiments, a partition includes one or more of the cells 100A . . . 100N, which are assigned to the partition, are used exclusively by the partition, and are not used by any other partitions in the system 100. Each partition establishes a subset of the hardware resources of system 100 that are to be used as a system environment for booting a single instance of the operating system. Accordingly, all processors, memory resources, and I/O in a partition are available exclusively to the software running in the partition.

An exemplary partition 190 is shown in the illustrated embodiment; however, embodiments of the invention are usable in systems that support partitioning and in systems that do not support partitioning. The exemplary partition 190 comprises cell 100A and cell 100B. In the embodiment shown in FIG. 1, each of the cells 100A . . . 100N can be assigned to one and only one partition; accordingly, further exemplary partitions (not shown) may be defined to include any of the cells 100C . . . 100N.

In an illustrative example of a multiprocessor computing system 100 having a plurality of cells 100A . . . 100N, one or more cell boards can be provided. Each cell board can include a cell controller and a plurality of CPU sockets 110. In the exemplary embodiment, each one of the cells 100A . . . 100N is associated with one CPU socket 110. Each CPU socket 110 can be equipped with a CPU module (e.g., a single-processor module, a dual-processor module, or any type of multiple-processor module) for equipping the system 100 with a plurality of CPUs such as exemplary CPU 120.

In an exemplary embodiment, a CPU 120 is coupled, such as by an internal link, to a processor cache, such as cache 130. Cache 130 may, for example, be an agent or a logic block implemented in a chipset for the system 100. In some embodiments, cache 130 can be located in CPU socket 110. Cache 130 includes a plurality of entries, each having a cache line and additional information for the cache line, shown in FIG. 2A and FIG. 2B below.

Cache 130, in the exemplary embodiment, is connected (e.g., electronically coupled with, or interconnected via an interconnect fabric 185) with a memory controller 142 having a coherency controller 140, however, in other embodiments, cache 130 may be designed to support any desired number of memory controllers 142 and coherency controllers 140.

Each memory controller 142 is able to support physical memory resources 150 that include one or more memory modules or banks, which may be and/or may include one or more conventional or commercially available dynamic random access memory (DRAM), synchronous DRAM (SDRAM), double data rate SDRAM (DDR-SDRAM) or Rambus DRAM (RDRAM) memory devices, among other memory devices. For organizational purposes, these memory resources 150 are organized into blocks called memory blocks 180. Each memory controller 142 can support a plurality of memory blocks 180.

Each coherency controller 140 includes an associated comparator, such as memory target CAM (MTC) 141. MTC 141 includes entries, each entry referring to a memory block 180. Each memory block 180 comprises a plurality of coherency units, such as exemplary coherency units 160A, 160B, 160C, 160D, 160E, 160F . . . 160N (referred to generically as "160"). Every coherency unit 160 in the system 100 is part of a memory block 180.

In an embodiment of the invention, each of the entries in MTC 141 includes state information to indicate whether the associated memory block 180 is a local memory region. Each memory block 180 may be designated as a CLM region, or as a non-local memory region.

In the illustrated example, memory block 180 is a local memory region, and memory block 180 includes coherency units 160E . . . 160N. Accordingly, the entry in MTC 141 for memory block 180 will include state information indicating that memory block 180 is a local memory region. The state information provided by MTC 141 may be used by coherency controller 140 and/or memory controller 142 to determine whether any of the coherency units 160 is included in a local memory region (such as the illustrated memory block 180).

While the illustration shows memory resources 150 that are organized into a plurality of coherency units 160, in some embodiments any number of coherency units 160 may be provided. While the illustration expressly shows only one memory block 180, any number of memory blocks 180 may be provided.

A data field 270 (shown in FIG. 2B), which contains memory data corresponding to a cache line 220 (shown in FIG. 2B), is included in every coherency unit 160 of the memory resources 150. A directory 170 is also included in every coherency unit 160 of the memory resources 150. Each directory 170 contains information associated with caching of the memory resources 150. An exemplary directory 170 can track where the corresponding coherency unit 160 has been cached. Examples of information in directory 170 include ownership field 172 (shown in FIG. 2B) for cache lines, such as data associating coherency unit 160 with a particular cache 130 on the system 100.

It is appreciated that the exemplary computer system 100 is merely illustrative of a computing environment in which the herein described systems and methods may operate and does not limit the implementation of the herein described systems and methods in computing environments having differing components and configurations, as the inventive concepts described herein may be implemented in various computing environments having various components and configurations. The invention is adapted for many different types of processors and multiprocessor architectures.

Exemplary Cache Features

Figure 2A:
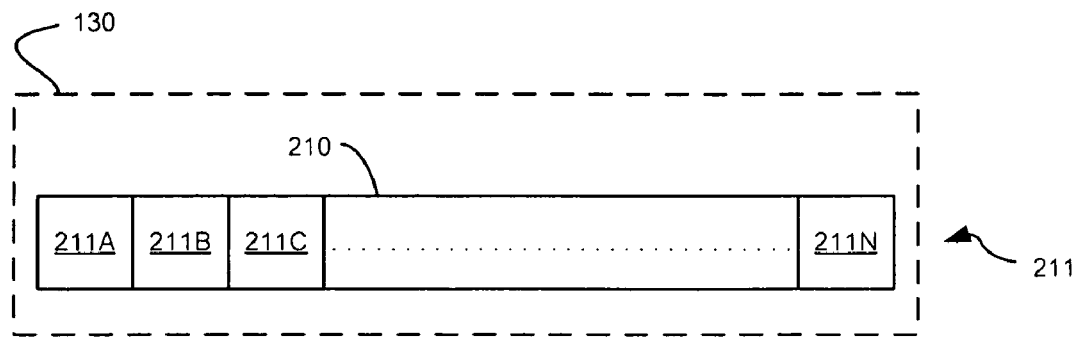
FIG. 2A is a diagram illustrating features of a cache, according to an embodiment of the invention.

FIG. 2A is a diagram illustrating features of a cache 130 according to an embodiment of the invention. In an embodiment, cache 130 can be implemented as an agent or as a logic block in a chipset for the system 100, or on a CPU socket 110. Cache 130 includes a cache table 210 having a plurality of cache entries 211A, 211B, 211C . . . 211N (each a cache entry 211).

Figure 2B:
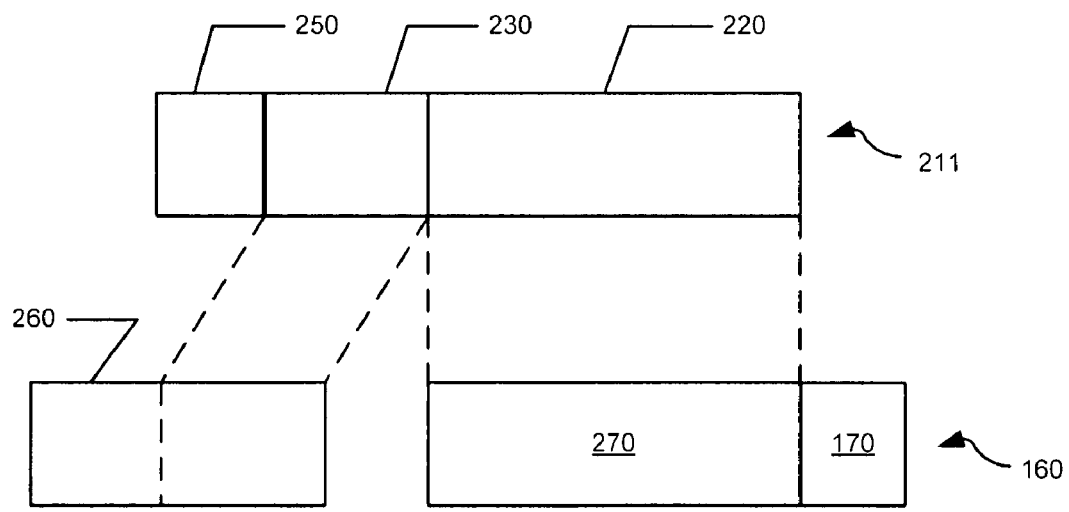
FIG. 2B is a diagram depicting an illustrative cache entry in a cache, according to an embodiment of the invention.

FIG. 2B is a diagram depicting an illustrative cache entry 211 in a cache 130 for practicing an embodiment of the invention. Each cache entry 211 includes a datum having a fixed number of bytes, known as a cache line 220, for holding a copy of a data field 270 of a selected coherency unit 160 that is in main memory. Main memory includes, for example, memory resources 150 such as DRAM memory associated with any of the cells 100A . . . 100N. In some embodiments, a coherency unit 160 is the smallest unit of memory that can be transferred between main memory and the cache 130.

In some embodiments, cache entry 211 includes additional information associated with the cache line 220. An illustrative example of cache entry 211 includes an address tag 230, and state information such as state 250. In some embodiments, address tag 230 is a value (e.g., a slot tag) that can be used to match the cache entry 211 with selected bits of an address 260 for the coherency unit 160 in main memory corresponding to the cache line 220. The selected bits of address 260 need not be contiguous, and are generally not contiguous.

Examples of state information can include information such as a valid bit, a dirty bit, and other data elements able to represent one or more states associated with the cache line 220. In an embodiment of the invention, state 250 has a value that can represent a modified state, an exclusive state, a shared state, and an invalid state.

In an embodiment, the directory 170 includes directory state information that is associated with the coherency unit 160. According to an embodiment of the invention, the directory 170 includes a directory state 171 having a value that can represent an exclusive state, a shared state, and an invalid state. In further embodiments, directory 170 includes ownership field 172 for the coherency unit 160, such as data associating the coherency unit 160 with a particular cache 130 on the system 100.

Exemplary Methods

Figure 3:
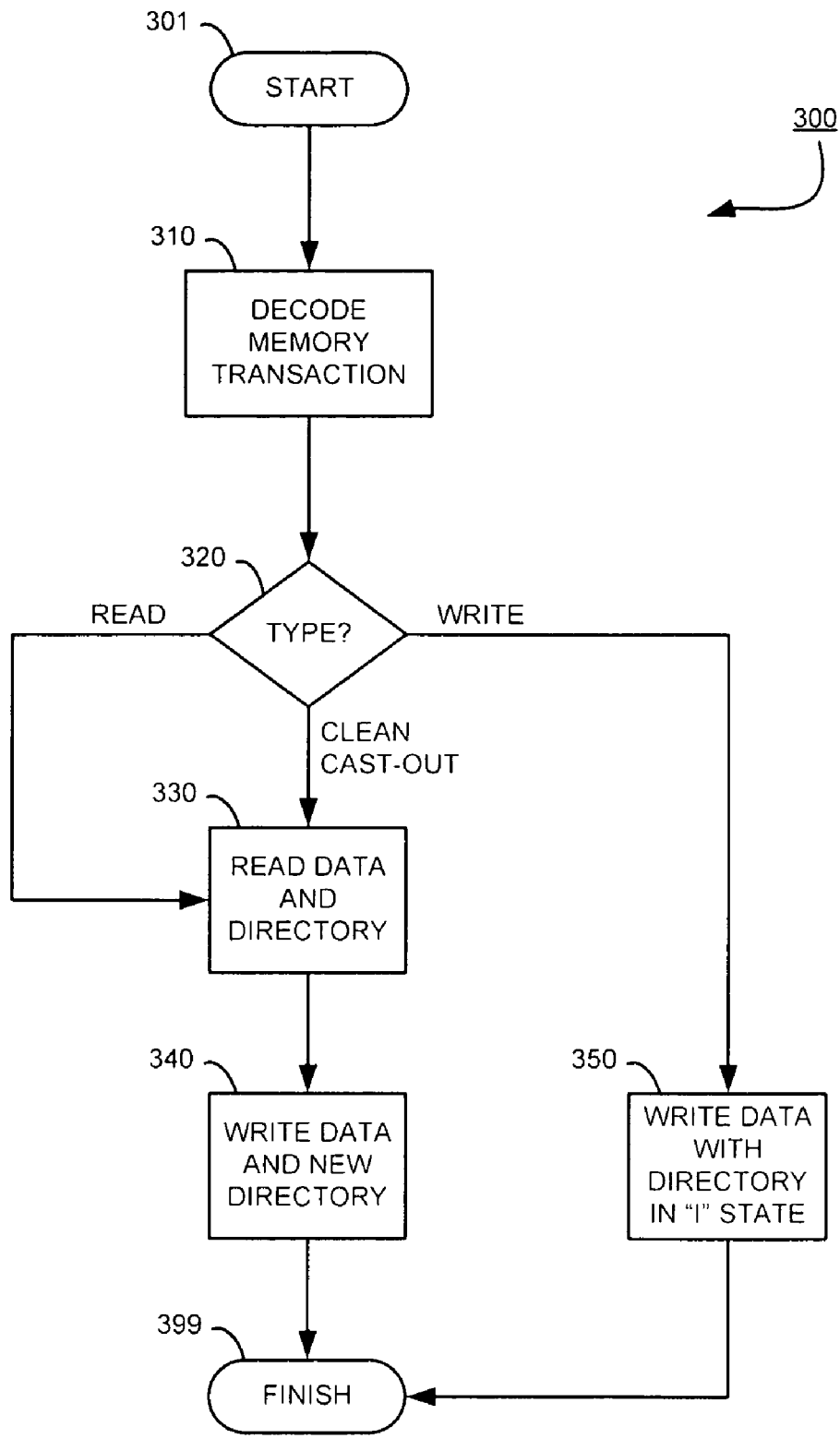
FIG. 3 is a flow chart of a method for coherency directory updating that does not use an embodiment of the present invention to check whether a memory block is a local memory region.

FIG. 3 is a flow chart of a method 300 for coherency directory updating that does not use an embodiment of the present invention to check whether a memory block 180 is a local memory region.

The method 300 begins at start block 301, and proceeds to block 310. At block 310, a memory transaction is decoded, such as by the memory controller 142 or coherency controller 140, so that the memory transaction may be performed using the cache 130. The memory transaction may have been received from the local CPU 120; e.g., a request by an application running on CPU 120. In other embodiments, the memory transaction may have been received via interconnect fabric 185 from any of the cells 100A . . . 100N.

Examples of types of memory transactions include read transactions, write transactions, and cast-out transactions (e.g., clean cast-outs of a cache line 220). In an embodiment, an address 260 (e.g., a physical address) is decoded for a desired memory block 180 upon which the transaction is to be performed. In some embodiments, the address 260 is translated by a translation lookaside buffer (TLB) from a virtual address to a physical address. In other embodiments, the address 260 can be a system address derived from a physical address. In further embodiments, the address 260 can be a fabric address. Using the address 260, a cache entry 211 is selected.

At block 320, a check is performed, such as by the memory controller 142 or coherency controller 140, based upon the type of the memory transaction. If the type of the memory transaction is a read transaction, the method 300 proceeds to block 330. If the type of the memory transaction is a clean cast-out transaction, the method 300 also proceeds to block 330. If the type of the memory transaction is a write transaction, the method 300 proceeds to block 350.

At block 330, the memory controller 142 or coherency controller 140 reads data in memory resources 150 (e.g., DIMMs, FBD DIMMs, DRAM) for the coherency unit 160 that corresponds to cache line 220. The coherency unit 160 includes data field 270 and directory 170.

At block 340, the memory controller 142 or coherency controller 140 writes data in memory resources 150 (e.g., DIMMs, FBD DIMMs, DRAM) for the coherency unit 160 that corresponds to cache line 220. The coherency unit 160 includes data field 270 and directory 170. If the type of the memory transaction is a read-invalidate transaction, an exemplary embodiment writes the directory state 171 as exclusive (e.g., "E") and writes ownership field 172 having a value that identifies ownership by the cache 130 that initiated the read transaction. If the type of the memory transaction is a clean cast-out transaction, an exemplary embodiment writes the directory state 171 as invalid (e.g., "I"), which indicates that the value of ownership field 172 is unimportant. The method 300 then concludes at block 399.

At block 350, for a write transaction, the memory controller 142 or coherency controller 140 writes data in memory resources 150 (e.g., DIMMs, FBD DIMMs, DRAM) for the coherency unit 160 that corresponds to cache line 220. The coherency unit 160 includes data field 270 and directory 170. In some embodiments, memory controller 142 or coherency controller 140 sets the state information of directory 170 to represent an invalid state (which also indicates that the value of ownership field 172 is unimportant), before writing directory 170 to the memory resources 150 as part of coherency unit 160. The method 300 then concludes at block 399.

Figure 4:
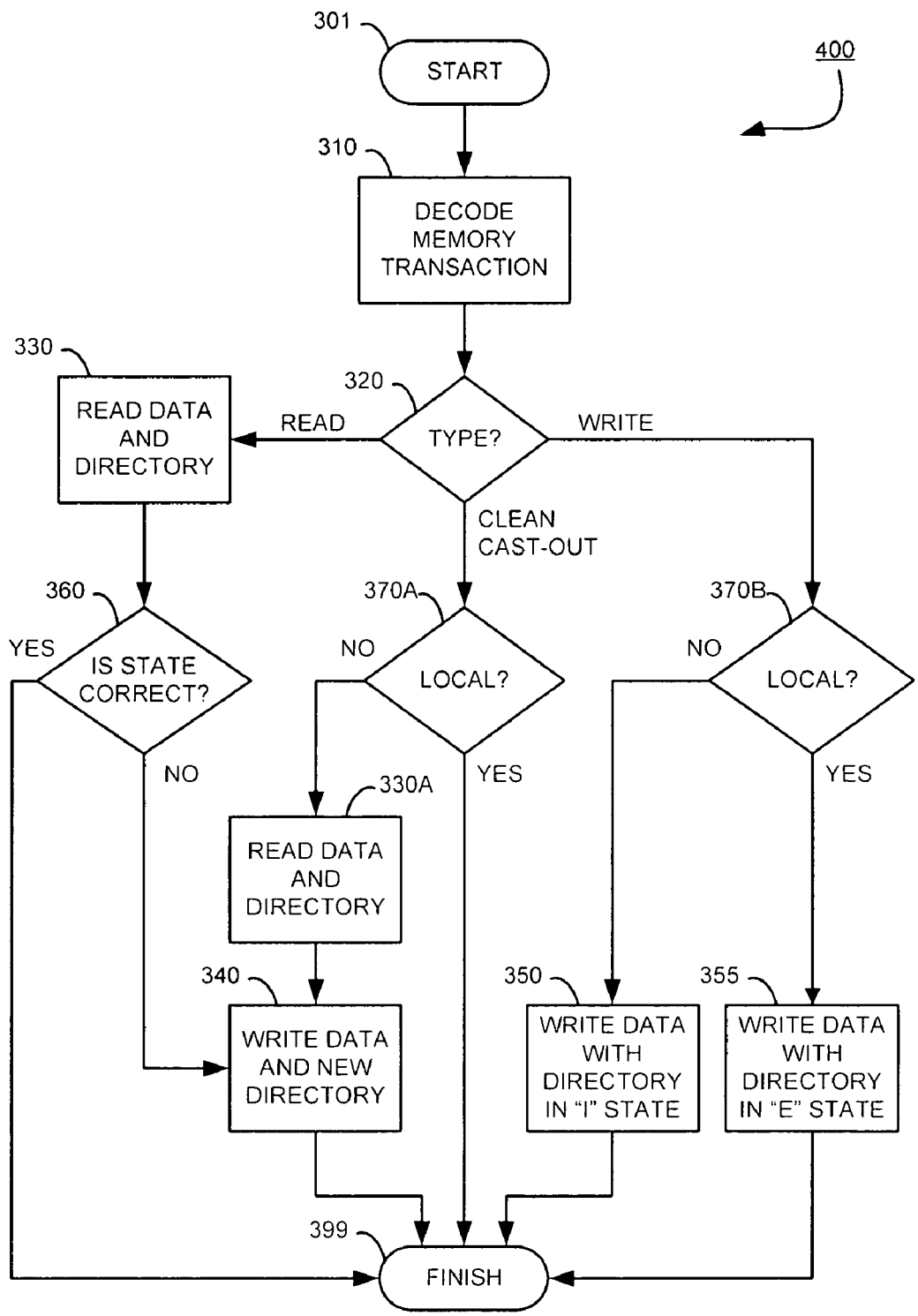
FIG. 4 is a flow chart of an exemplary method for coherency directory updating, according to an embodiment of the present invention.

FIG. 4 is a flow chart of an exemplary method 400 for coherency directory updating according to a second embodiment of the present invention.

The method 400 begins at start block 301, and proceeds to block 310. Block 310 is as described above with respect to FIG. 3.

The check at block 320 is performed as described above with respect to FIG. 3. Based on the check at block 320, if the type of the memory transaction is a read transaction, the method 400 proceeds to block 330. If the type of the memory transaction is a clean cast-out transaction, the method 400 proceeds to block 370A. If the type of the memory transaction is a write transaction, the method 400 proceeds to block 370B.

Block 330 is as described above with respect to FIG. 3. The method 400 proceeds to block 360, where a check is performed to determine the correctness of directory 170; e.g., whether the directory 170 is in a correct state. The check relates to the combination of the directory state 171 and the ownership information in ownership field 172 of directory 170. The check determines whether the ownership field 172 for directory 170, residing in memory resources 150, is already properly recording that the cache 130 that issued the read transaction is the owner of the cache line 220. The state of directory 170 is deemed correct if it does not need to be changed as a result of the current transaction.

If the directory 170 is in the correct state, no action is required, and the method 400 concludes at block 399. Accordingly, in an embodiment of the invention, when an update to directory 170 would result in no change to the state of directory 170, the directory update is discarded. In this way, embodiments of the invention avoid wasteful updates to directory 170 for read transactions that will not actually change the state of directory 170 in the memory resources 150. That is, in the case that the coherency unit 160 is included in a memory block 180 that is a local memory region, we will leave the previous cache 130 as the owner of the cache line 220. In this case, the directory 170 in main memory is already correct and does not need to be updated with a memory write.

If the directory 170 is not in the correct state, the method 400 proceeds to block 340, which is as described above with respect to FIG. 3, and thereafter, the method 400 concludes at block 399.

If the type of the memory transaction is a clean cast-out transaction, based on the check at block 320, then at block 370A a check is performed to determine whether the memory block 180 comprising coherency unit 160 corresponding to cache line 220 is local; that is, whether the coherency unit 160 is part of a memory block 180 that is a local memory region. In an embodiment, the check at block 370A is performed by MTC 141.

If the memory block 180 comprising coherency unit 160 is not local, the method 400 proceeds to block 330A, which is identical to block 330 as described above with respect to FIG. 3. The method 400 proceeds to block 340, which is as described above with respect to FIG. 3. The method 400 then concludes at block 399.

If the memory block 180 comprising coherency unit 160 is local, no action is required, and the method concludes at block 399. In this way, embodiments of the invention discard the clean cast-out transaction, to avoid cycling the memory resources 150 (e.g., DIMMs) to change the directory 170 state to invalid. Accordingly, a future read transaction from the same cache 130 (or, in some embodiments, process thread) will, in most cases, avoid an update of directory 170. However, in some embodiments, the update of directory 170 will not be avoided if the transaction is a read-invalidate transaction, from the same process thread, to a cache line 220 that was previously in the shared state.

If the type of the memory transaction is a write transaction, based on the check at block 320, then at block 370B a check is performed to determine whether the memory block 180 comprising coherency unit 160 corresponding to cache line 220 is local; that is, whether the coherency unit 160 is part of a memory block 180 that is a local memory region. In an embodiment, the check at block 370A is performed by MTC 141.

If the memory block 180 comprising coherency unit 160 is not local, the method 400 proceeds to block 350, which is as described above with respect to FIG. 3. The method 400 then concludes at block 399.

If the memory block 180 comprising coherency unit 160 is local, the method 400 proceeds to block 355. At block 355, for a write transaction, the memory controller 142 or coherency controller 140 writes data in memory resources 150 (e.g., DIMMs, FBD DIMMs, DRAM) for the coherency unit 160 that corresponds to cache line 220. The coherency unit 160 includes data field 270 and directory 170. In an exemplary embodiment, memory controller 142 or coherency controller 140 sets the directory state 171 of directory 170 to represent an exclusive state before writing directory 170 to the memory resources 150 as part of coherency unit 160. In a further embodiment, the memory controller 142 or coherency controller 140 updates the information in ownership field 172 of directory 170, such that the cache 130 initiating the write transaction will be the exclusive owner of the coherency unit 160. In this way, embodiments of the invention set the exclusive state for an explicit write-back transaction to the memory resources 150 for a local memory region that includes memory block 180, thus allowing a future read transaction from the same cache 130 (or, in some embodiments, process thread) to avoid updating directory 170.

In another embodiment, the concept of a default owner is supported. The MTC 141 is programmed with default owner information for each entry referring to a memory block 180. In the processing step of block 355, the memory controller 142 or coherency controller 140 updates the ownership field 172 of directory 170, and sets the state information 171 of the directory 170 to exclusive, such that the default ownership information from the MTC 141 will be recorded in directory 170 as the exclusive owner of the coherency unit 160. In this way, embodiments of the invention are able to set the exclusive state for an explicit write-back transaction to the memory resources 150 for a local memory region that includes memory block 180, thus allowing a future read transaction from the cache 130 (or, in some embodiments, process thread) that is the default owner to avoid updating directory 170. The method 400 then concludes at block 399.

Although exemplary implementations of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A system for coherency directory updating in a multi-processor computing system, comprising:
a plurality of memory resources having a directory:
a plurality of cells having respective caches and configured to be operably connected to an interconnect fabric, wherein the caches are physically separate from the memory resources and each of the caches includes address tags and state information associated with corresponding entries of the caches, wherein at least one of the caches includes entries for a corresponding plurality of coherency units that are part of the memory resources, wherein the plurality of coherency units are included in a memory block representing a contiguous portion of the plurality of memory resources, and wherein the directory is physically separate from the caches and stores ownership information that associates a particular one of the coherency units with at least one of the caches; and
a controller configured to control at least a portion of the plurality of memory resources, and having a comparator configured to identify whether the memory block is local to a particular one of the cells in response to a write transaction;
wherein the controller, if the memory block is local to the particular cell, is configured to set a state of the directory for the particular coherency unit to exclusive in response to the write transaction; and
wherein the controller, if the memory block is not local to the particular cell, is configured to set the state of the directory for the particular coherency unit to invalid in response to the write transaction.

2. The system of claim 1 wherein the controller is further configured, for a read transaction, to discard an update to the directory if the directory is in a correct state.

3. The system of claim 1 wherein the controller, if the memory block is local, is configured to discard a cast-out transaction.

4. The system of claim 1 wherein the controller is a memory controller.

5. The system of claim 1 wherein the controller comprises a coherency controller.

6. The system of claim 1 wherein the comparator comprises a content-addressable memory.

7. The system of claim 1 wherein the memory block is local if and only if the memory block is a local memory region associated with the particular cell.

8. The system of claim 1 wherein the memory block is local if and only if the memory block is a local memory region associated with a socket of the particular cell.

9. The system of claim 1 wherein the memory block is local if and only if the memory block is a local memory region associated with a processor of the particular cell.

10. The system of claim 1 wherein the memory block is local if and only if the memory block is a local memory region associated with a process thread running on a socket of the particular cell.

11. A method for coherency directory updating in a multi-processor computing system having a directory in a plurality of memory resources, the multiprocessor computing system further including caches, the method comprising:

decoding a memory transaction for a coherency unit included in a memory block representing a contiguous portion of the plurality of memory resources, wherein the memory resources having the directory are physically separate from the caches, and wherein each of the caches includes address tags and state information associated with corresponding entries of the caches; and
if the memory transaction comprises a write transaction,
checking whether the memory block is local by checking an entry maintained in a controller and associated with the memory block;
setting a directory state of the directory that is included in the plurality of memory resources,
writing the directory with the directory state set to invalid if the memory block is not local; and
writing the directory with the directory state set to exclusive if the memory block is local.

12. The method of claim 11 further comprising, if the memory transaction comprises a read transaction,
checking if the directory is correct, and
writing the directory only if the directory is not correct.

13. The method of claim 11 further comprising, if the memory transaction comprises a cast-out transaction,
checking whether the memory block is local,
reading the coherency unit only if the memory block is not local, and
writing to the coherency unit only if the memory block is not local.

14. The method of claim 11 wherein the memory block is local if and only if the memory block is a local memory region associated with a cell in the multiprocessor computing system.

15. The method of claim 11 wherein the memory block is local if and only if the memory block is a local memory region associated with a socket of a cell in the multiprocessor computing system.

16. The method of claim 11 wherein the memory block is local if and only if the memory block is a local memory region associated with a processor of a cell in the multiprocessor computing system.

17. The method of claim 11 wherein the memory block is local if and only if the memory block is a local memory region associated with a process thread running on a socket of a cell in the multiprocessor computing system.

18. The method of claim 11 further comprising, if the memory transaction comprises a write transaction,
updating an ownership field of the directory to a default ownership value for the memory block, and
setting the directory state to exclusive.

19. A system for coherency directory updating in a multi-processor computing system comprising:
a plurality of memory resources having a directory;
a plurality of cells having respective caches and configured to be operably connected to an interconnect fabric, wherein the caches are physically separate from the memory resources and each of the caches includes address tags and state information associated with corresponding entries of the caches, wherein at least one of the caches includes entries for a corresponding plurality of coherency units that are part of the memory resources, each coherency unit included in a memory block representing a contiguous portion of the plurality of memory resources, wherein the directory is physically separate from the caches and stores ownership information associating at least one of the caches with a particular one of the coherency units; and a controller configured to be operably connected to the interconnect fabric, and configured to control at least a portion of the plurality of memory resources, wherein the controller is configured to further determine a type associated with a memory transaction for the memory block, and check whether the memory block is local, wherein the controller, if the memory transaction comprises a cast-out transaction, is configured to read the particular coherency unit only if the memory block is not local to a cell of the multiprocessor computing system, and to write the particular coherency unit only if the memory block is not local to the cell;

wherein the controller, if the memory transaction comprises a write transaction, is configured to write the directory with a state set to invalid if the memory block is not local to the cell; and to write the directory with the state set to exclusive if the memory block is local to the cell.

20. The system of claim 19 wherein the controller, if the memory transaction comprises a read transaction, is configured to write the directory only if the directory is not correct.

21. The system of claim 1, wherein the directory is one of a plurality of directories associated with corresponding coherency units, and wherein the plurality of directories are physically separate from the caches.

22. The system of claim 1, wherein the controller is a memory controller provided between the at least one of the caches and the memory resources.

23. The method of claim 11, wherein the directory is associated with the coherency unit, wherein the memory block further includes additional coherency units associated with additional directories, and wherein the directories are physically separate from the caches.

24. The method of claim 11, wherein the checking, setting, and writing are performed by a controller between the caches and the memory resources.

* * * * *

UNITED STATES PATENT AND TRADEMARK OFFICE
CERTIFICATE OF CORRECTION

Page 1 of 1

PATENT NO.         : 7,941,610 B2
APPLICATION NO.    : 11/413158
DATED              : May 10, 2011
INVENTOR(S)        : Erin A. Handgen et al.

It is certified that error appears in the above-identified patent and that said Letters Patent is hereby corrected as shown below:

In column 9, line 11, in Claim 1, delete "directory:" and insert -- directory; --, therefor.

Signed and Sealed this
Twenty-fifth Day of October, 2011

David J. Kappos
*Director of the United States Patent and Trademark Office*